US010260587B2

(12) United States Patent
Kawai

(10) Patent No.: US 10,260,587 B2
(45) Date of Patent: Apr. 16, 2019

(54) LEAF SPRING FIXING STRUCTURE, ELECTRICAL CONTACT STRUCTURE, AND METHOD FOR MANUFACTURING THESE

(71) Applicant: OMRON CORPORATION, Kyoto-shi, Kyoto (JP)

(72) Inventor: Wakahiro Kawai, Konan (JP)

(73) Assignee: OMRON Corporation, Kyoto-shi (JP)

( * ) Notice: Subject to any disclaimer, the term of this patent is extended or adjusted under 35 U.S.C. 154(b) by 0 days.

(21) Appl. No.: 15/755,624

(22) PCT Filed: Apr. 6, 2017

(86) PCT No.: PCT/JP2017/014390
§ 371 (c)(1),
(2) Date: Feb. 27, 2018

(87) PCT Pub. No.: WO2017/191727
PCT Pub. Date: Nov. 9, 2017

(65) Prior Publication Data
US 2018/0259024 A1   Sep. 13, 2018

(30) Foreign Application Priority Data

May 2, 2016   (JP) .................................. 2016-092489

(51) Int. Cl.
*H01R 11/28*   (2006.01)
*F16F 1/30*   (2006.01)
(Continued)

(52) U.S. Cl.
CPC .................. *F16F 1/30* (2013.01); *F16F 1/18* (2013.01); *H01M 2/10* (2013.01); *H01M 2/1038* (2013.01);
(Continued)

(58) Field of Classification Search
CPC .. H01M 2/1038; H01M 2/1044; H01R 11/282
See application file for complete search history.

(56) References Cited

U.S. PATENT DOCUMENTS 5,876,241 A * 3/1999 Frantz ................. H01M 2/1044
429/100
5,980,309 A * 11/1999 Frantz .................... H05K 3/301
439/500

(Continued)

FOREIGN PATENT DOCUMENTS

GB    2435352 A    8/2007
JP    S59-106944 A  6/1984
(Continued)

OTHER PUBLICATIONS

English translation of the International Search Report (ISR) of PCT/JP2017/014390 dated Jul. 11, 2017.
(Continued)

*Primary Examiner* — Tho D Ta
(74) *Attorney, Agent, or Firm* — Metrolexis Law Group, PLLC

(57) ABSTRACT

Provided is a plate spring fixing structure and the like which do not necessitate complex assembling processes and thus can reduce production cost and can be reduced in size, and which enable adjustment, during a production process, of the extent to which the plate spring is bent. A holding structure (1A) includes a first plate spring (12) that has: a fixed portion (12*a*) embedded in and fixed to a first molded resin part (11); and a spring portion (12*b*) which is not fixed and which has a spring property. The fixed portion (12*a*) has a face that is not in contact with the first molded resin part (11).

13 Claims, 6 Drawing Sheets

(51) Int. Cl.
 *F16F 1/18* (2006.01)
 *H01M 2/10* (2006.01)
 *H01M 4/02* (2006.01)
 *H01M 10/04* (2006.01)

(52) U.S. Cl.
 CPC ......... *H01M 4/02* (2013.01); *H01M 10/0427* (2013.01); *F16F 2226/00* (2013.01); *H01M 2/1044* (2013.01); *H01M 2004/027* (2013.01); *H01M 2004/028* (2013.01); *H01R 11/282* (2013.01)

(56) References Cited

U.S. PATENT DOCUMENTS

| | | | | |
|---|---|---|---|---|
| 6,381,199 | B1 * | 4/2002 | Kroner | G04C 3/008 368/203 |
| 6,603,670 | B1 * | 8/2003 | Chien | H01M 2/1022 361/801 |
| 7,128,599 | B1 * | 10/2006 | Ho | H01R 43/24 439/500 |
| 7,591,672 | B2 * | 9/2009 | Wu | H01M 2/1038 439/500 |
| 9,540,846 | B2 * | 1/2017 | Sersch | G07C 9/00944 |
| 2004/0137786 | A1 * | 7/2004 | Yu | H01R 13/2442 439/500 |
| 2005/0277326 | A1 * | 12/2005 | Chung | H01R 11/282 439/500 |

FOREIGN PATENT DOCUMENTS

| | | |
|---|---|---|
| JP | H2-96799 A | 4/1990 |
| JP | H2-312399 A | 12/1990 |
| JP | 2001-250521 A | 9/2001 |
| JP | 3104139 U | 9/2004 |
| TW | 200723578 A | 6/2007 |

OTHER PUBLICATIONS

English translation of the Written Opinion (WO) of PCT/JP2017/014390 dated Jul. 11, 2017.
Office action dated Dec. 7, 2017 in a counterpart Taiwan (TW) patent application for TW Application No. 106112714.

* cited by examiner

US 10,260,587 B2

LEAF SPRING FIXING STRUCTURE, ELECTRICAL CONTACT STRUCTURE, AND METHOD FOR MANUFACTURING THESE

TECHNICAL FIELD

The present invention relates to a plate spring fixing structure and an electric contact structure in each of which an electrically conductive plate spring is partially fixed to a molded resin part, and relates to methods for producing the plate spring fixing structure and the electric contact structure.

BACKGROUND ART

A plate spring has conventionally been known to be used in an electric contact or the like which utilizes the elastic force of the plate spring. Examples of various electronic components including such an electric contact include battery boxes and piezo buzzers.

Button type or coin type cells, which are often used in small electronic devices (e.g., mobile terminals, watches, clinical thermometers, and the like), are in the shape of a button or a coin and configured such that: a housing can, in the form of a cylinder with a closed end, serves as a positive electrode; and a closure can that covers the opening of the housing can (positive electrode) serves as a negative electrode. One example of a known structure to attach such a button type or coin type cell is a coin type cell holding structure as disclosed in Patent Literature 1.

Figure 6:
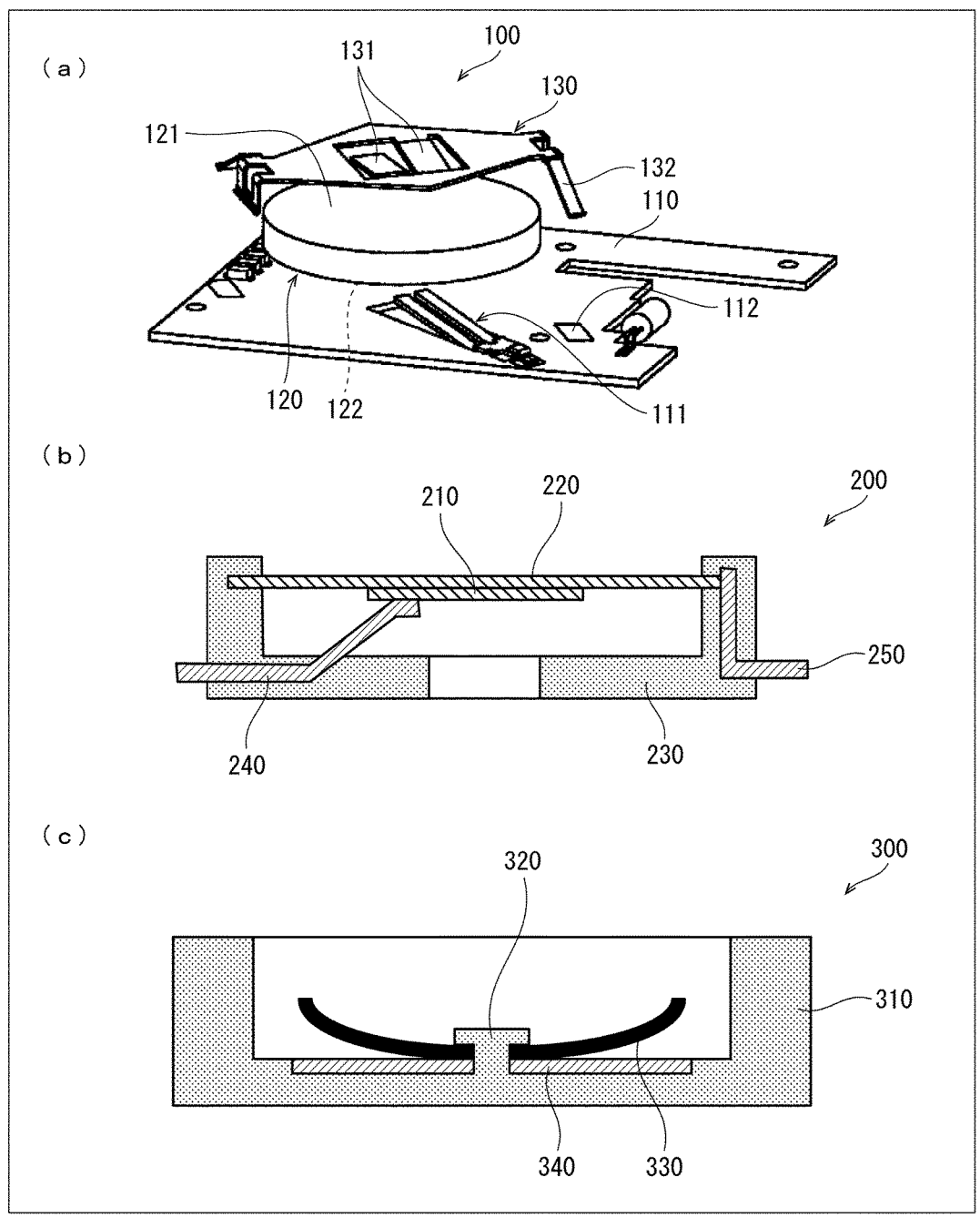

As illustrated in (a) of FIG. 6, a holding mechanism 100 disclosed in Patent Literature 1 includes a circuit board 110, a coin type cell 120, and a positive connection terminal 130 which is provided in a three-dimensional manner. The coin type cell 120 is sandwiched and held by a negative connection terminal 111 on the circuit board 110 and the positive connection terminal 130 such that the coin type cell 12 has some space between itself and the circuit board 110. The coin type cell 120 is made up of a positive housing can 121 and a negative closure can 122. The circuit board 110 includes: a negative electrode contact spring portion 111 (plate spring) that makes pressure contact with the back face (negative closure can 122) of the coin type cell 120; and a positive power source land 112. The positive connection terminal 130 includes a contact spring portion 131 (plate spring) that makes pressure contact with the central portion of the positive housing can 121 of the coin type cell 120; and a conductive spring portion 132 that extends so as to hold the side face of the coin type cell and to make contact with the positive power source land 112 on the circuit board 110.

In the holding mechanism 100 arranged as described above, the cell is mechanically pressed by the metal plate springs having a spring property, and thus the holding mechanism 100 is capable of preventing momentary contact failure between the terminals and the cell in case of movement of the cell due to vibration or the like.

On the other hand, piezo buzzers are used in various electronic devices, and are arranged to generate sound by causing a piezoelectric element bonded to a diaphragm to deform and allowing the diaphragm to vibrate. There are various proposals for the structure of such a piezo buzzer. For example, Patent Literature 2 discloses a piezo buzzer that is structured to eliminate the need for a soldering process and to reduce production cost.

Specifically, as illustrated in (b) of FIG. 6, the piezo buzzer 200 disclosed in Patent Literature 2 includes: a diaphragm 220 with a piezoelectric element 210 bonded to one face thereof; an outer case 230 that is made of resin and that holds the diaphragm 220; and a metal terminal 240, serving as a plate spring, which has been formed together with the outer case 230 through insert molding. The metal terminal 240 is bent up from the bottom of the outer case 230, and is arranged to press one end portion thereof against the piezoelectric element 210 using the elastic force caused by the spring property, thereby forming an electric contact. The piezo buzzer 200 further includes another metal terminal 250. The metal terminal 250 has also been formed together with the outer case 230 through insert molding and is arranged to partially contact the diaphragm 220. The piezo buzzer 200 arranged like this does not necessitate a soldering process.

CITATION LIST

Patent Literature

[Patent Literature 1]
  Japanese Patent Application Publication Tokukai No. 2001-250521 (Publication date: Sep. 14, 2001)
[Patent Literature 2]
  Japanese Patent Application Publication Tokukaihei No. 2-312399 (Publication date: Dec. 27, 1990)
[Patent Literature 3]
  Japanese Patent Application Publication Tokukaisho No. 59-106944 (Publication date: Jun. 20, 1984)

SUMMARY OF INVENTION

Technical Problem

However, conventional techniques like those described above have issues like those described below.

Specifically, in regard to the holding mechanism 100 illustrated in (a) of FIG. 6, the positive connection terminal 130 has been bent (processed) in advance by pressing or the like so as to have a desired three-dimensional shape. A complex process is necessary to assemble such a positive connection terminal 130 and the circuit board 110, and production cost increases. In addition, such a positive connection terminal 130, which has a three-dimensional shape, needs to be large to a certain extent for industrial transfer. Furthermore, the circuit board 110 also needs to have various wires formed thereon and be large to a certain extent. Therefore, the holding mechanism 100 also has an issue in that the portion for housing the cell becomes large.

On the other hand, the piezo buzzer 200 illustrated in (b) of FIG. 6 has an issue in that a complex metal mold is necessary to insert the metal terminal 240, which has been bent in a three-dimensional manner, into the outer case 230 made of resin, and that the production cost increases and variations occur in the position of insertion of the metal terminal 240. The piezo buzzer 200 has another issue in that the extent to which the metal terminal 240 is bent cannot be adjusted later in the production process and thus a stable product quality cannot be guaranteed.

In relation to the above issues, Patent Literature 3 discloses a method for assembling a metal plate spring, which has a three-dimensional structure, and a resin housing. The disclosed method is a method of molding a metal plate spring having a three-dimensional structure and a resin housing such that they are integral with each other. Specifically, as illustrated in (c) of FIG. 6, a plate spring fixing structure 300 disclosed in Patent Literature 3 is arranged such that: a metal plate spring 330 is fixed with a boss 320 at the center of a resin housing 310; and the unfixed face of the metal plate spring 330 is separated from the resin housing 310 by a film 340. With this arrangement, in the plate spring fixing structure 300, the metal plate spring is assembled to the plate spring fixing structure 300 concurrently with the molding of the resin housing, and thereby production cost is reduced.

However, this method has an issue in that the metal plate spring 330 needs to be positioned accurately within the metal mold for the formation of the boss 320, that the production process becomes complex due to the film 340 provided on the face of the metal plate spring 330, and that the production cost increases.

The present invention was made in view of the above-described issues, and it is an object of the present invention to provide: a plate spring fixing structure and an electric contact structure which do not necessitate complex assembling processes and thus can reduce production cost and can be reduced in size, and which enable adjustment, during a production process, of the extent to which the plate spring is bent; and methods for producing the plate spring fixing structure and the electric contact structure.

Solution to Problem

In order to attain the above object, a plate spring fixing structure of one aspect of the present invention includes: a plate spring that has an electric conductivity; and a first molded resin part to which the plate spring is partially fixed, the plate spring having a fixed portion and a spring portion, the fixed portion being embedded in and fixed to the first molded resin part, the spring portion having a spring property and being not fixed to the first molded resin part, the fixed portion having a face which is not in contact with the first molded resin part.

A method for producing a plate spring fixing structure of one aspect of the present invention includes: an attaching/temporarily fixing step including attaching and temporarily fixing a flat plate to a temporary fixation member, the flat plate having an electric conductivity and a spring property; a resin molding step including placing the temporary fixation member, which has the flat plate temporarily fixed thereon, within a metal mold and carrying out resin molding to form a first molded resin part such that the flat plate is embedded in the first molded resin part; a first removing step including removing the first molded resin part and detaching the temporary fixation member; and a plate spring forming step including bending the flat plate and thereby separating at least part of the flat plate from the first molded resin part to form a plate spring.

Advantageous Effects of Invention

One aspect of the present invention provides the following effect: it is possible to provide a plate spring fixing structure and an electric contact structure which do not necessitate complex assembling processes and thus can reduce production cost and can be reduced in size, and which enable adjustment, during a production process, of the extent to which the plate spring is bent, and methods for producing the plate spring fixing structure and the electric contact structure.

Figure 1:
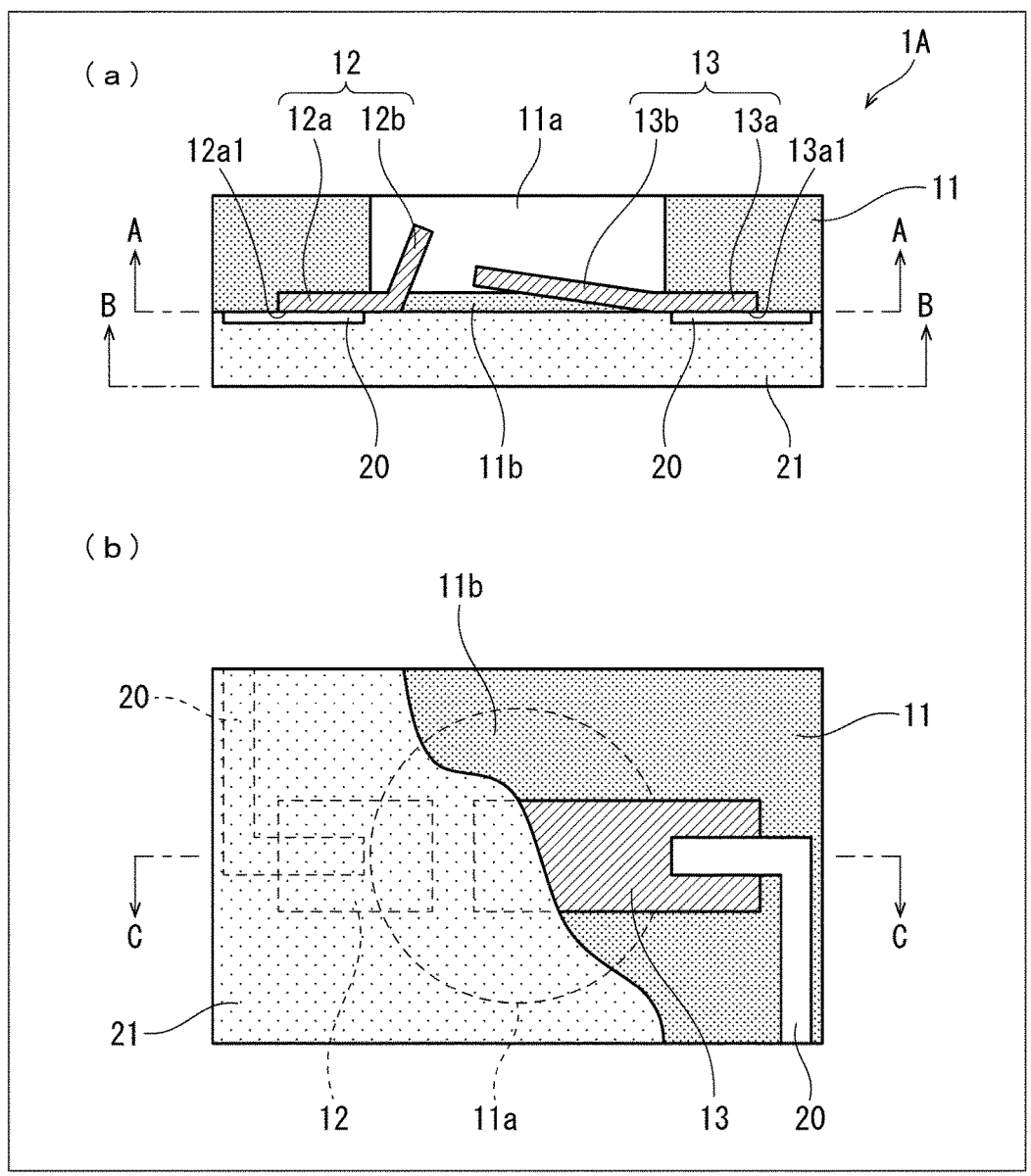

BRIEF DESCRIPTION OF DRAWINGS (a) of FIG. 1 is a lateral cross-sectional view schematically illustrating a configuration of a holding structure serving as a plate spring fixing structure and an electric contact structure of Embodiment 1 of the present invention. (b) of FIG. 1, showing the plate spring fixing structure, is a bottom view illustrating a partial cross-sectional view taken along line A-A in (a) of FIG. 1 and a partial cross-sectional view taken along line B-B of (a) of FIG. 1.

Figure 2:
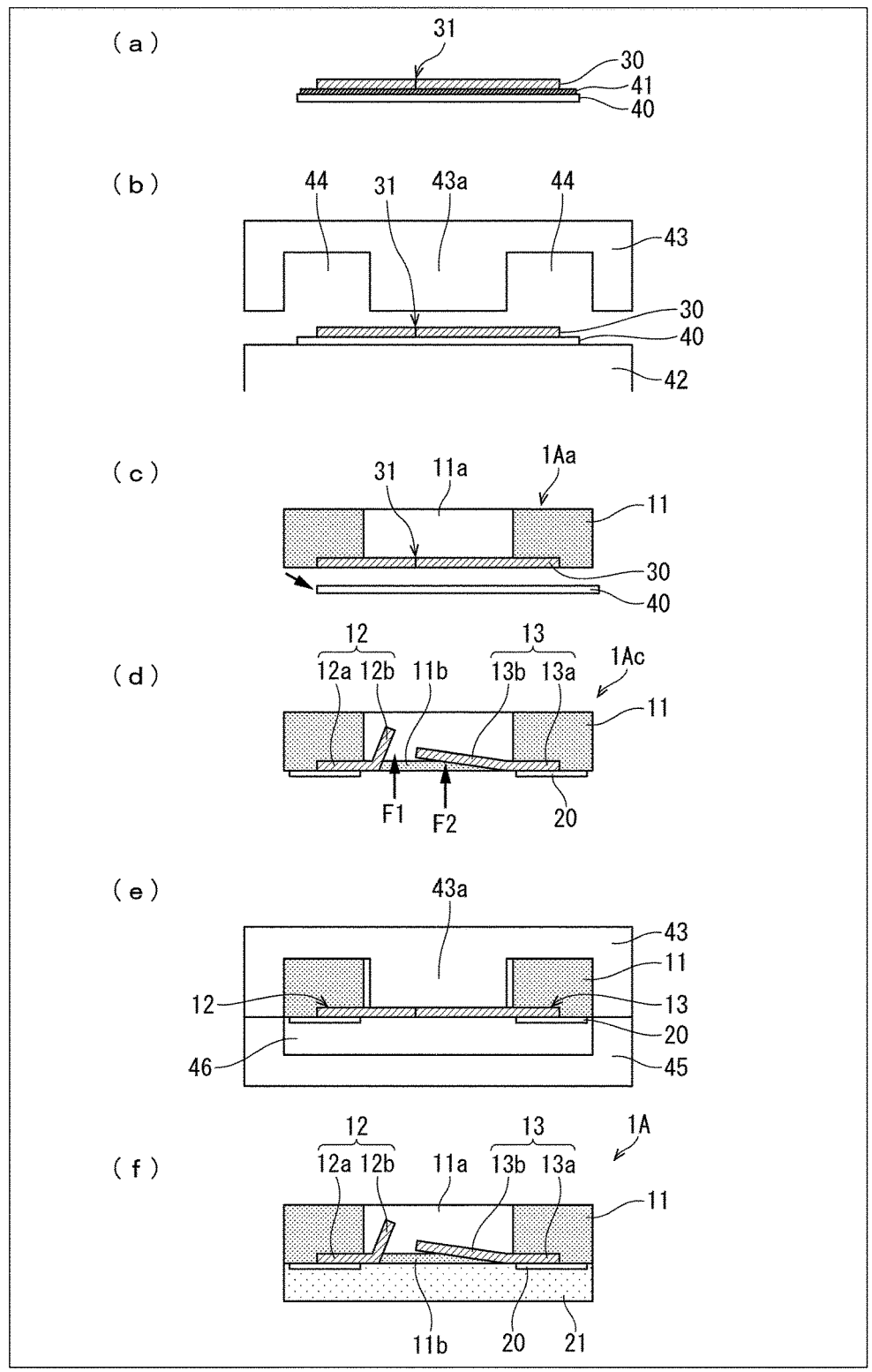

(a), (b), (c), (d), (e), and (f) of FIG. 2 are lateral cross-sectional views illustrating one example of a method for producing the holding structure.

Figure 3:
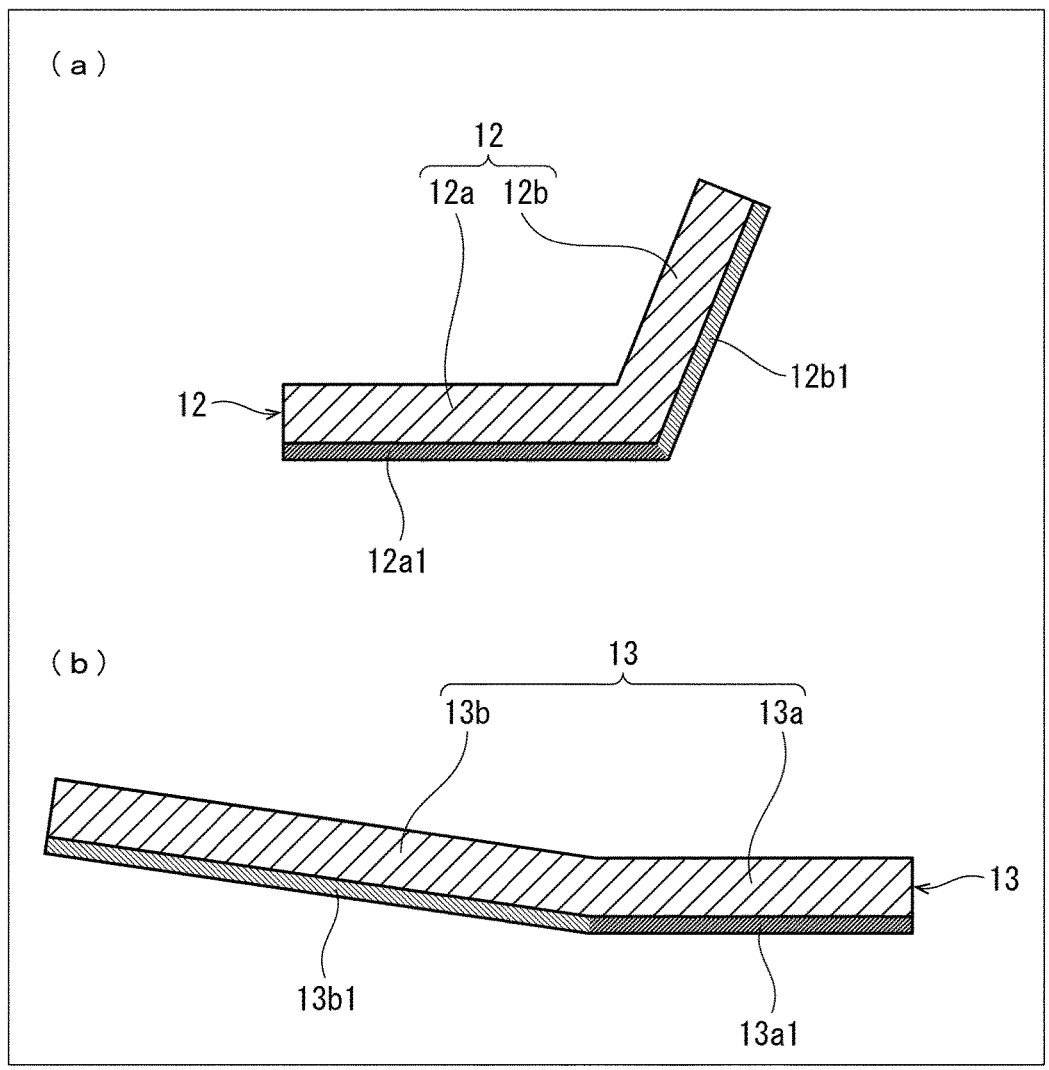

(a) of FIG. 3 is a lateral cross-sectional view illustrating one of two plate springs of the holding structure. (b) of FIG. 3 is a lateral cross-sectional view illustrating the other of the two plate springs.

Figure 4:
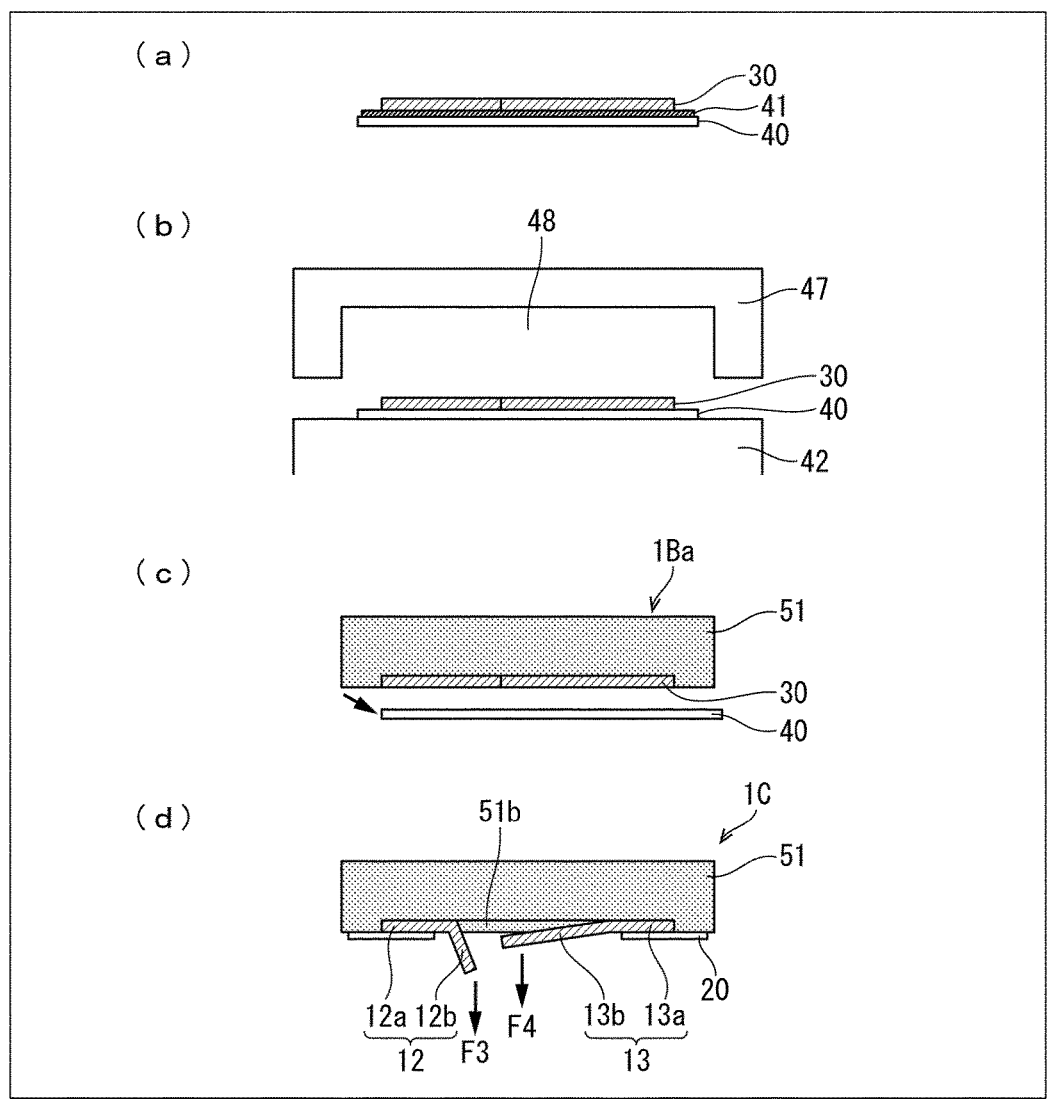

(a), (b), (c), and (d) of FIG. 4 are lateral cross-sectional views illustrating one example of a method for producing a plate spring fixing structure of Embodiment 2 of the present invention.

Figure 5:
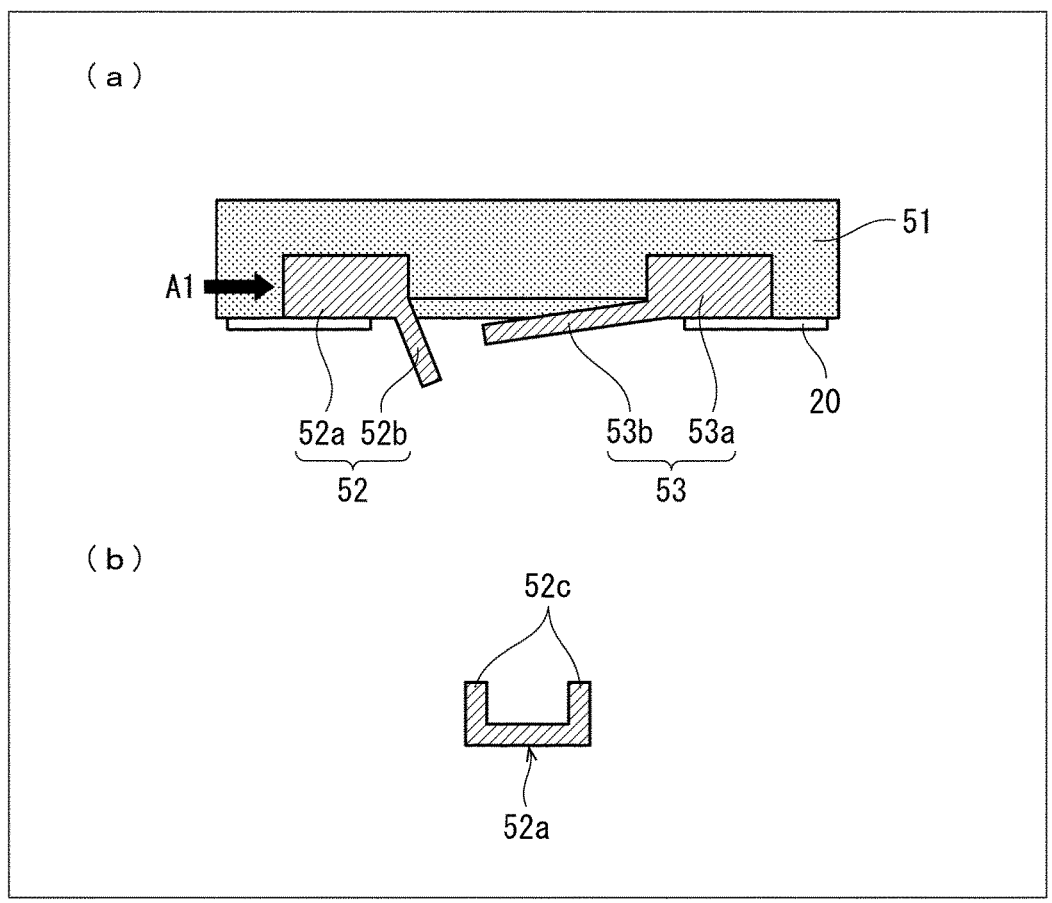

(a) of FIG. 5 is a lateral cross-sectional view illustrating a modified version of the plate spring fixing structure. (b) of FIG. 5 illustrates the shape of a fixed portion of a plate spring of the modified version of the plate spring fixing structure as viewed from direction of arrow in (a) of FIG. 5.

(a), (b), and (c) of FIG. 6 are lateral cross-sectional views schematically illustrating configurations of conventional plate spring fixing structures.

DESCRIPTION OF EMBODIMENTS

The following description will discuss one embodiment of the present invention with reference to FIGS. 1 to 3.

In Embodiment 1, a holding structure for holding a coin type cell or the like is discussed, which is one example of an application of a plate spring fixing structure or an electric contact structure of the present invention.

It should be noted that, although a holding structure for holding a coin type cell or the like, which is one example of a plate spring fixing structure or an electric contact structure, is discussed in Embodiment 1, the plate spring fixing structure and the electric contact structure of the present invention are not limited to the holding structure. For example, the present invention is applicable to (i) a plate spring fixing structure in which a plate spring, such as a terminal of a piezo buzzer or a terminal of an electronic component package, is partially fixed, (ii) an electric contact structure in which the plate spring, to which a wire is electrically connected, serves as an electrode, and (iii) methods for producing these structures.

<Configuration of Holding Structure of One Aspect of the Present Invention>

The following description will discuss a configuration of a holding structure 1A, which serves as a plate spring fixing structure or an electric contact structure of Embodiment 1, with reference to (a) and (b) of FIG. 1. (a) of FIG. 1 is a lateral cross-sectional view schematically illustrating the configuration of the holding structure 1A as a plate spring fixing structure or an electric contact structure of Embodiment 1. (b) of FIG. 1, showing the holding structure 1A, is a bottom view illustrating a partial cross-sectional view taken along line A-A in (a) of FIG. 1 and a partial cross-sectional view taken along line B-B of (a) of FIG. 1. It should be noted that a cross-sectional view taken along line C-C of (b) of FIG. 1 corresponds to the lateral cross-sectional view shown in (a) of FIG. 1.

In the following description, the holding structure 1A is an electric contact structure of one aspect of the present invention, in which a wire electrically connected to a plate spring is provided. Note, however, that the holding structure 1A, which is in a certain stage of the production process before the formation of the wire, can be regarded as a holding structure 1Aa or a holding structure 1Ab each serving as a plate spring fixing structure of Embodiment 1. The holding structure 1Aa and the holding structure 1Ab will be discussed later in detail in the description for a method for producing the holding structure 1A of Embodiment 1.

As illustrated in (a) and (b) of FIG. 1, the holding structure 1A of Embodiment 1 includes: a first molded resin part 11 that has a space 11a (hole) for housing and holding a coin type cell or the like (not illustrated); and a first plate spring 12 and a second plate spring 13 each of which has one portion embedded in and fixed to the first molded resin part 11 and another portion projecting inside the space 11a. The holding structure 1A further includes: a second molded resin part 21 that is provided so as to cover the surface of the first molded resin part 11 opposite the face in which the space 11a is formed; and wires 20 which are provided on the surface of the first molded resin part 11, which lie between the first molded resin part 11 and the second molded resin part 21, and which are electrically connected to the first plate spring 12 and the second plate spring 13, respectively.

The first plate spring 12 includes: a fixed portion 12a embedded in and fixed to the first molded resin part 11; and a spring portion 12b which is not fixed to the first molded resin part 11, which projects inside the space 11a, and which has a spring property. The second plate spring 13 includes: a fixed portion 13a embedded in and fixed to the first molded resin part 11; and a spring portion 13b which is not fixed to the first molded resin part 11, which projects inside the space 11a, and which has a spring property.

The first molded resin part 11 has, at the bottom of the space 11a, a space bottom 11b that has the same thickness as the spring portion 12b and the spring portion 13b of the plate springs. The space bottom 11b is integral with the first molded resin part 11.

The following description will discuss constituents of the holding structure 1A of Embodiment 1 one by one.

(First Molded Resin Part)

The first molded resin part 11 has the space 11a as described earlier. A desired shape of the space 11a can be obtained by using a metal mold of an appropriate shape in a first resin molding step in the method for producing the holding structure 1A (described later). When the holding structure 1A is produced, the shape of the space 11a may be appropriately changed according to the intended use of the holding structure 1A. The space 11a is designed to be able to house, for example, a button type cell, which is an object to be held. In this case, the button type cell makes contact with the first plate spring 12 and the second plate spring 13, and thereby electricity can be drawn from the button type cell through the wires 20.

The first molded resin part 11 is made from, for example, a resin such as polycarbonate (PC) or acrylonitrile-butadiene-styrene (ABS). The first molded resin part 11 may be made from some other kind of resin. The first molded resin part 11 is not particularly limited as to its shape other than the shape of the space 11a, provided that the first molded resin part 11 has a space 11a suitably shaped for the intended use (i.e., shaped to correspond to the shape of an object to be held in the space 11a).

The holding structure 1A of Embodiment 1 has the space bottom 11b at the bottom of the space 11a, as described earlier. In general, the space bottom 11b is formed in the following manner in a production process in the method for producing the holding structure 1A (described later). The first molded resin part 11 is prepared by carrying out injection molding of resin while keeping the first plate spring 12 and the second plate spring 13 in a state in which they are arranged such that: the fixed portion 12a and the spring portion 12b are flush with each other; and the fixed portion 13a and the spring portion 13b are flush with each other. In this way, the space bottom 11b is formed. The holding structure 1A has the space bottom 11b, and is thus capable of housing and stably holding a cell or the like within the space 11a.

(Plate Spring)

The first plate spring 12 and the second plate spring 13 may be formed by dividing a single flat plate as will be discussed later, or may be formed by bending respective different flat plates. The first plate spring 12 and the second plate spring 13 each have a thickness of, for example, 0.2 mm to 0.3 mm. Note, however, that the thickness is not limited to this range. The first plate spring 12 and the second plate spring 13 may have the same thickness or may have respective different thicknesses.

The first plate spring 12 is configured such that a line normal to a plate face of the spring portion 12b and a line normal to a plate face of the fixed portion 12a extend in different directions. In other words, the first plate spring 12 is bent substantially in the middle of its length such that the spring portion 12b projects toward the upper portion of the space 11a. The second plate spring 13 is also configured in the same manner, except that the first plate spring 12 is bent to a greater extent than the second plate spring 13. Therefore, according to the holding structure 1A of Embodiment 1, for example, in a case where a cell is housed in the space 11a, the first plate spring 12 (more specifically, the spring portion 12b) is brought into pressure contact with a side face of the cell, whereas the second plate spring 13 (more specifically, the spring portion 13b) is brought into pressure contact with the bottom of the cell, whereby the cell can be held and electricity can be drawn from the cell.

It should be noted that the extent to which the first plate spring 12 is bent and the extent to which the second plate spring 13 are not particularly limited.

The number of plate springs in a plate spring fixing structure or an electric contact structure of the present invention is not particularly limited. The structure may have only one plate spring, or may have three or more plate springs. A plate spring fixing structure or an electric contact structure, in which a necessary number of plate spring(s) is/are fixed to the first molded resin part 11, may be prepared in accordance with the intended use.

Materials for the first plate spring 12 and the second plate spring 13 are not limited to a particular kind, provided that the materials are electrically conductive, can be elastically deformed, and have a spring property while in the elastically deformed state. Examples of the materials include: metals; polymers, such as resins, whose surfaces are coated with an electrically conductive film; and composite materials made of a metal and some other material.

The fixed portion 12a of the first plate spring 12 is embedded in and fixed to the first molded resin part 11, and has an unfixed face 12a1 that is not in contact with the first molded resin part 11. The fixed portion 13a of the second plate spring 13 is embedded in and fixed to the first molded resin part 11, and has an unfixed face 13a1 that is not in contact with the first molded resin part 11.

The fixed portion 12a of the first plate spring 12 is arranged such that: the other plate face of the fixed portion 12a (i.e., the face opposite the unfixed face 12a1) is at least partially fixed tightly by the first molded resin part 11; and a side face perpendicular to the plate face is tightly fixed by the first molded resin part 11. The fixed portion 13a of the second plate spring 13 is arranged such that: the plate face of the fixed portion 13a opposite the unfixed face 13a1 is at least partially fixed tightly by the first molded resin part 11; and a side face perpendicular to the plate face is tightly fixed by the first molded resin part 11.

The unfixed face 12a1 and the unfixed face 13a1 are in electric communication with respective different wires 20, and are in contact with the second molded resin part 21. That is, although the unfixed face 12a1 and the unfixed face 13a1 are not fixed by the first molded resin part 11, the unfixed face 12a1 and the unfixed face 13a1 may be fixed by the second molded resin part 21.

The first plate spring 12 and the second plate spring 13 may each have a processed surface in its portion that makes contact with the first molded resin part 11 or the second molded resin part 21. For example, the fixed portion 12a and the fixed portion 13a of the plate springs may each have a surface, which is to be tightly fixed by the first molded resin part 11, roughened by etching or the like. In this case, an anchor effect provides a firmer fixation to the first molded resin part 11.

(Second Molded Resin Part)

The second molded resin part 21 is made from, for example, a resin such as polycarbonate (PC) or acrylonitrile-butadiene-styrene (ABS). The second molded resin part may be made from some other kind of resin. The second molded resin part 21 is not limited to a particular shape.

It is preferable that the resin material constituting the second molded resin part 21 is less adhesive to the first plate spring 12 and the second plate spring 13 than the resin material constituting the first molded resin part 11 is to the first plate spring 12 and the second plate spring 13. This provides the following effect. When the second molded resin part 21 is made by resin molding in the production process for the holding structure 1A (describe later), the spring portion 12b and the spring portion 13b of the plate springs make contact with the second molded resin part 21. In this process, the spring portion 12b and the spring portion 13b can be prevented from easily adhering to and being fixed to the second molded resin part 21. One example of a resin material that has a poor adhesion to metal is the one that is obtained by adding 10% to 30% glass filler to ABS.

(Wire)

The wires 20 are provided on a surface, in which the fixed portion 12a and the fixed portion 13a of the plate springs are embedded, of the first molded resin part 11 such that the wires 20 are electrically connected to the unfixed face 12a1 and the unfixed face 13a1 of the plate springs and extend out of the first molded resin part 11. This allows the first plate spring 12 and the second plate spring 13 to serve as electric contacts.

The holding structure 1A of Embodiment 1 is arranged such that the plate springs are each embedded in the first molded resin part 11 so that the unfixed face 12a1 and the unfixed face 13a1 are flush or substantially flush with the surface of the first molded resin part 11.

Therefore, the wires 20 can be made by spraying silver (Ag) ink with the use of an inkjet printer. That is, the wires 20 can be formed easily. The wires 20 may be made from a material other than Ag, and may be formed by some other method. The thicknesses and the like of the wires are not particularly limited.

It should be noted that the phrase "flush or substantially flush with" means that the difference in level between the unfixed faces 12a1 and 13a1 of the plate springs and the surface of the first molded resin part 11 is small (flat) to the extent that the wires 20 can be formed by printing using an apparatus such as an inkjet printer.

<Method for Producing Holding Structure of One Aspect of the Present Invention>

The following description will discuss a method for producing the holding structure 1A of Embodiment 1 with reference to (a), (b), (c), (d), (e), and (f) of FIG. 2. (a), (b), (c), (d), (e), and (f) of FIG. 2 are lateral cross-sectional views illustrating one example of the method for producing the holding structure 1A of Embodiment 1.

(Attaching/Temporarily Fixing Step)

As illustrated in (a) of FIG. 2, according to the method for producing the holding structure 1A of Embodiment 1, one plate face of a flat plate 30 made of phosphor bronze or stainless steel is first attached to and temporarily fixed to a temporary fixation film 40 (temporary fixation member) with an adhesive 41 (this step is "attaching/temporarily fixing step").

The flat plate 30 has a kiss cut 31 at a desired position of its plate face. This makes it possible to easily form the first plate spring 12 and the second plate spring 13 by dividing the flat plate 30 and causing the divided parts to deform in a subsequent step. Note, however, that the kiss cut 31 is not essential.

The material for the flat plate 30 is selected so as to satisfy desired properties of the first plate spring 12 and the second plate spring 13.

The temporary fixation film 40 can be made from, for example, polyethylene terephthalate (PET), polyethylene naphthalate (PEN), polyphenylene sulfide (PPS), or the like. The temporary fixation film 40 is preferably made from a flexible material that is permeable to UV light, for reasons described later.

Alternatively, the temporary fixation film 40 may be carrier tape, a glass epoxy substrate, or the like. The material for the temporary fixation film 40 is not limited to a particular kind, provided that it can temporarily fix the flat plate 30 thereon and can be removed after the production of the holding structure 1A.

The temporary fixation can be achieved, for example, with the use of the adhesive 41 applied on one face of the temporary fixation film 40. The adhesive 41 is, for example, a UV-curing adhesive. Specifically, for example, GL-3005H available from Gluelabo, serving as the adhesive 41, is applied to the temporary fixation film 40, which is made of PET and which has a thickness of 50 μm, so that the adhesive has a thickness of 2 μm to 3 μm. The adhesive may be applied by inkjet printing. Then, the flat plate 30 is positioned relative to and placed on the temporary fixation film 40, and UV light of, for example, 3000 mJ/cm$^2$ is shined, whereby the adhesive cures and the flat plate 30 is temporarily fixed to the temporary fixation film 40.

Since the flat plate 30 does not have a three-dimensional shape, the attaching/temporarily fixing step of the method for producing the holding structure 1A of Embodiment 1 can be carried out by, for example, transferring the flat plate 30 industrially with the use of an air chuck or the like, placing the flat plate 30 in position on the temporary fixation film 40, and attaching the flat plate 30 to the temporary fixation film 40. As such, the attaching/temporarily fixing step can be carried out relatively easily.

(Resin Molding Step)

A resin molding step of the method for producing the holding structure 1A of Embodiment 1 includes a first placing-in-mold step and a first resin molding step.

After the attaching/temporarily fixing step is carried out, the temporary fixation film 40, with the flat plate 30 temporarily fixed thereon, is placed within and attached to the inside of a lower metal mold 42 (first lower mold) such that the face with no flat plate 30 provided thereon makes contact with the lower metal mold 42 (this step is "first placing-in-mold step") (see (b) of FIG. 2). It should be noted that the adhesive 41 is not illustrated in (b) of FIG. 2.

Then, a resin material is injected into a mold cavity 44, which is defined by the lower metal mold 42 and an upper metal mold 43 (first upper mold) having a protrusion 43a configured to come into abutment with a portion of a surface of the flat plate 30, and thereby injection molding of resin is carried out such that the temporarily fixed flat plate 30 is embedded in the first molded resin part 11 (this step is "first resin molding step").

In Embodiment 1, the protrusion 43a is in the form of a cylinder. Note, however, that the shape of the protrusion 43a is not limited as such. The shape of the protrusion 43a determines the shape of the space 11a in the first molded resin part 11.

The conditions under which the injection molding is carried out can be appropriately selected according to the resin that constitutes the first molded resin part 11. For example, in a case where polycarbonate (PC) is used, the injection molding is carried out under the conditions in which injected resin temperature is 270° C. and injection pressure is 100 MPa. In a case where acrylonitrile-butadiene-styrene (ABS) is used, the injection molding is carried out under the conditions in which injected resin temperature is 180° C. and injection pressure is 20 kgf/cm$^2$.

The resin that constitutes the first molded resin part 11 may be selected from a variety of resin materials. The conditions under which the injection molding is carried out are not particularly limited.

(First Removing Step)

After the resin molding step is carried out, the first molded resin part 11 with the flat plate 30 embedded therein is removed from the mold cavity 44, and the temporary fixation film 40 is detached from the surface of the first molded resin part 11 (this step is "first removing step") (see (c) of FIG. 2). This exposes the face, which is not in contact with the first molded resin part 11, of the flat plate 30. The first molded resin part 11 has the space 11a therein.

In a case where the temporary fixation film 40 is, for example, a PET film, the PET film greatly deforms by thermal change during the resin molding step and comes off of the first molded resin part 11. Therefore, the PET film can be easily detached from the first molded resin part 11.

This structure in which the flat plate 30 is embedded in the first molded resin part 11, at a point in time after the first removing step, can be regarded as the holding structure 1Aa, which serves as a plate spring fixing structure of Embodiment 1. In this structure, the shape of the flat plate 30 is different from the foregoing shapes of the plate spring 12 and the plate spring 13. However, in the following plate spring forming step, the flat plate 30 can be easily made into the plate spring 12 and the plate spring 13 by press-bending the flat plate 30. Therefore, the flat plate 30 can be virtually regarded as plate springs. As such, according to the production method of Embodiment 1, it is possible to provide a plate spring fixing structure, as the holding structure 1Aa, which does not necessitate complex assembly processes and thus can reduce production cost and can be reduced in size, and which enables adjustment, during the production process, of the extent to which the plate springs are bent.

(Plate Spring Forming Step)

After the first removing step is carried out, the flat plate 30 is deformed by pressing the flat plate 30 in the direction indicated by arrow F1 and in the direction indicated by arrow F2 in (d) of FIG. 2, and thereby the first plate spring 12 and the second plate spring 13 are formed (this step is "plate spring forming step") (see (d) of FIG. 2). More specifically, positions at certain distances from the kiss cut 31 of the flat plate 30 are pushed toward the inside of the space 11a, whereby the flat plate 30 is divided into two parts at the kiss cut 31 and the parts are bent. In this way, the first plate spring 12 and the second plate spring 13 are formed. This causes the spring portion 12b and the spring portion 13b to project inside the space 11a.

In this step, the force of pushing in the directions of arrow F1 and arrow F2 can be appropriately selected in accordance with the material that constitutes the flat plate 30. In a case where the flat plate 30 is, for example, made from phosphor bronze, the flat plate 30 is bent to a predetermined extent by a stress of 400 N/mm$^2$. In a case where the flat plate 30 is made from stainless steel, the flat plate 30 is bent to a predetermined extent by a stress of 200 N/mm$^2$.

The resin that constitutes the flat plate 30 can be selected from a variety of materials. The conditions under which the bending is carried out are not particularly limited.

This structure in which the first plate spring 12 and the second plate spring 13 are embedded in the first molded resin part 11, at a point in time after the first removing step, can be regarded as the holding structure 1Ab, which serves as a plate spring fixing structure of Embodiment 1.

It should be noted that, in a case where the flat plate 30 has no kiss cut 31, a cut can be made with a laser or the like before the flat plate 30 is divided, for example.

Also note that, instead of press bending, the first plate spring 12 and the second plate spring 13 may be formed by lifting up edges of the flat plate 30. In this case, the plate springs can be formed in the following manner, for example: an appropriate groove or the like is made in the flat plate 30; and then the groove is used to apply a force and pull the flat plate 30 to thereby divide the flat plate 30.

(Circuit Forming Step)

After the plate spring forming step is carried out, wires 20 (wiring circuit) are formed on the surface of the first molded resin part 11 opposite the surface in which the space 11a is formed, so as to be connected to the fixed portion 12a and the fixed portion 13a of the plate springs, respectively (this step is "circuit forming step") (see (d) of FIG. 2).

The wires 20 can be formed by: a method by which a conductive material (e.g., silver ink or the like) is sprayed by an inkjet printing process or the like; a method using aerosol; a method using a dispenser; or the like. It is preferable that the wiring circuit is formed by printing the wires by spraying conductive ink.

Such a structure, in which the first plate spring 12 and the second plate spring 13 are electrically wired and in which the spring portion 12b and the spring portion 13b of the plate springs are projecting inside the space 11a, can be regarded as a holding structure 1Ac, which serves as an electric contact structure of Embodiment 1. The holding structure 1Ac can be used as a molded component whose terminals are the first plate spring 12 and the second plate spring 13.

The plate spring forming step and the circuit forming step may be carried out in any order. Therefore, it is also possible to obtain a holding structure 1Ad, serving as an electric contact structure of Embodiment 1, in which the flat plate 30 is electrically wired. However, in order to reduce the risk of disconnection of the wires 20, it is preferable to carry out the plate spring forming step first and then carry out the circuit forming step.

(Second Placing-in-Mold Step)

After both the plate spring forming step and the circuit forming step are carried out, the first molded resin part 11, on which the wires 20 are formed and in which the first plate spring 12 and the second plate spring 13 are embedded and fixed, is housed in the upper metal mold 43 (second upper mold) (this step is "second placing-in-mold step") (see (e) of FIG. 2). The first molded resin part 11 here has thermally shrunk as compared to what it was in the first resin molding step, and therefore the first molded resin part 11 can be easily housed in the upper metal mold 43 such that a small gap forms between the first molded resin part 11 and the upper metal mold 43. Alternatively, respective different upper molds may be used in the first placing-in-mold step and the second placing-in-mold step.

In this step, the protrusion 43a of the upper metal mold 43 causes the first plate spring 12 to be elastically deformed such that the spring portion 12b becomes flush with the fixed portion 12a, and causes the second plate spring 13 to be elastically deformed such that the spring portion 13b becomes flush with the fixed portion 13a.

(Second Resin Molding Step, Second Removing Step)

After the second placing-in-mold step is carried out, a resin material is injected into a mold cavity 46, which is defined by the upper metal mold 43 and a lower metal mold 45 (second lower mold) having a recess corresponding to the shape of the second molded resin part 21, and thereby injection molding of resin is carried out such that the fixed portion 12a and the fixed portion 13a of the plate springs, the wires 20, and the face of the first molded resin part 11 having the wires 20 thereon are covered by the resin (this step is "second resin molding step").

The resin subjected to the injection molding in the second resin molding step may be the same as or different from that of the first molded resin part 11. The second resin molding step may be carried out as follows, for example: a resin material obtained by adding 10% to 30% glass filler to ABS is injection-molded under the conditions in which injected resin temperature is 180° C. and injection pressure is 200 MPa.

Then, after the second resin molding step is carried out, the molded product is removed from the mold cavity 46. In this way, the holding structure 1A, which serves as an electric contact structure of one aspect of the present invention, is finished (this step is "second removing step") (see (f) of FIG. 2).

In this step, the spring portion 12b of the first plate spring 12 and the spring portion 13b of the second plate spring 13, which were kept compressed by the protrusion 43a of the upper metal mold 43, regain their shapes formed in the plate spring forming step, because of their spring properties. In a case where the second molded resin part 21 is made from a resin material that poorly adheres to metal, such as a glass-filler-containing resin, the spring portions readily regain their shapes.

It is preferable that the faces, which are to be covered by the second molded resin part 21, of the first plate spring 12 and the second plate spring 13 are provided with processed surfaces before the second resin molding step. This is described below with reference to (a) and (b) of FIG. 3. (a) of FIG. 3 is a lateral cross-sectional view illustrating one (first plate spring 12) of the two plate springs of the holding structure 1A. (b) of FIG. 3 is a lateral cross-sectional view illustrating the other (second plate spring 13) of the two plate springs.

As illustrated in (a) of FIG. 3, the first plate spring 12 has the foregoing unfixed face 12a1 and a processed plate face 12b1. The processed plate face 12b1 is a plate face, which faces the second molded resin part, of the spring portion 12b. Similarly, as illustrated in (b) of FIG. 3, the second plate spring 13 has the foregoing unfixed face 13a1 and a processed plate face 13b1. The processed plate face 13b1 is a plate face, which faces the second molded resin part, of the spring portion 13b.

The processed plate face 12b1 and the processed plate face 13b1 of the plate springs are in contact with the second molded resin part 21 during the second resin molding step, and they need to be separated from the second molded resin part 21 after the second removing step. In view of this, it is preferable that the processed plate face 12b1 and the processed plate face 13b1 are less adhesive to the second molded resin part 21 than the unfixed face 12a1 and the unfixed face 13a1 are to the second molded resin part 21. For example, the processed plate face 12b1 and the processed plate face 13b1 are coated with silicon or the like in advance.

In the production method of Embodiment 1, a single flat plate 30 is attached to the temporary fixation film 40 in the attaching/temporarily fixing step. Note, however, that two flat plates arranged side by side, corresponding to the first plate spring 12 and the second plate spring 13, respectively, may be attached to the temporary fixation film 40. In this case, it can be said that the flat plate 30 has been divided from the beginning. The two flat plates may be attached to the temporary fixation film 40 so as to be arranged without gaps, or may be attached to the temporary fixation film 40 so as to be arranged with a small gap therebetween.

The holding structure 1A of Embodiment 1, which is configured as has been discussed, includes: the first plate spring 12 and the second plate spring 13, each of which has an electric conductivity; and the first molded resin part 11 to which each of the plate springs is partially fixed. The first plate spring 12 has: the fixed portion 12a embedded in and fixed to the first molded resin part 11; and the spring portion 12b not fixed to the first molded resin part 11 and having a spring property. The second plate spring 13 is similarly configured. The fixed portion 12a and the fixed portion 13a each have a face that is not in contact with the first molded resin part 11.

The holding structure 1A configured like above can be prepared by, for example, injection molding of resin. This eliminates the need for complex processes for assembling plate springs which have been bent in a three-dimensional manner. As such, it is possible to simplify production process and reduce production cost.

Furthermore, since the fixed portion 12a has a face that is not in contact with the first molded resin part 11, the foregoing structure can be produced by, for example: carrying out injection molding while keeping a temporary fixation member in a state in which it is temporarily bonded to that face of the fixed portion 12a; and thereafter removing the temporary fixation member and adjusting the extent to which the plate springs are bent. This eliminates the need for a complex metal mold for injection molding, and also eliminates the need for, for example, a high-accuracy positioning between the metal mold and the plate springs. In addition, it is possible to adjust, during the production process, the extent to which the plate springs are bent. Furthermore, it is also possible to form, during the production process, wires electrically connected to the plate springs.

This eliminates the need for a printed circuit board that needs to be large to a certain extent, eliminates the need for transferring the plate springs which have been bent in a three-dimensional manner, and makes it possible to reduce the size of a plate spring fixing structure.

As such, it is possible to provide a plate spring fixing structure which does not necessitate complex assembling processes and thus can reduce production cost and can be reduced in size, and which enables adjustment, during the production process, of the extent to which the plate springs are bent.

Embodiment 2

The following description will discuss another embodiment of the present invention with reference to FIG. 4. It should be noted that features of Embodiment 2 other than those described in Embodiment 2 are the same as those of Embodiment 1. For convenience, members having functions identical to those illustrated in the drawings of Embodiment 1 are assigned identical referential numerals and their descriptions are omitted.

In Embodiment 1, the holding structure 1A for holding a coin type cell or the like, in which the first plate spring 12 and the second plate spring 13 are embedded in and fixed to the first molded resin part 11 having the space 11a so as to project inside the space 11a, was discussed as one example of a plate spring fixing structure of the present invention and as one example of an electric contact structure of the present invention. In contrast, in Embodiment 2, a plate spring fixing structure 1B and an electric contact structure 1C, in each of which a first plate spring 12 and a second plate spring 13 are embedded in and fixed to a surface of a first molded resin part 51 that is in the shape of a rectangular prism and that has no space 11a, is discussed as another example of a plate spring fixing structure of the present invention and as another example of an electric contact structure of the present invention.

In the holding structure 1A of Embodiment 1, the shape of the space 11a imposes limitations on the sizes of cells or other assembly components. In contrast, the plate spring fixing structure 1B and the electric contact structure 1C of Embodiment 2 can be each arranged such that only a spring portion 12b and a spring portion 13b of the plate springs are projecting from the surface of the first molded resin part 51, and therefore do not impose such limitations.

The following description will discuss a method for producing the plate spring fixing structure 1B and the electric contact structure 1C of Embodiment 2, with reference to (a), (b), (c), and (d) of FIG. 4. (a), (b), (c), and (d) of FIG. 4 are lateral cross-sectional views illustrating one example of the method for producing the plate spring fixing structure 1B and the electric contact structure 1C of Embodiment 2. It should be noted that the fixing structure 1B includes a fixing structure 1Ba and a fixing structure 1Bb (these will be described later).

As illustrated in (a) of FIG. 4, according to the method for producing the plate spring fixing structure 1B and the electric contact structure 1C of Embodiment 2, an attaching/temporarily fixing step is carried out first in the same manner as Embodiment 1.

Next, after the attaching/temporarily fixing step is carried out, a first placing-in-mold step is carried out in the same manner as described in Embodiment 1 (see (b) of FIG. 4). Then, a resin material is injected into a mold cavity 48 defined by a lower metal mold 42 and an upper metal mold 47 that has a recess corresponding to the shape of the first molded resin part 51, and thereby injection molding of resin is carried out such that a temporarily fixed flat plate 30 is embedded in the first molded resin part 51 (this step is "first resin molding step").

Then, after the first resin molding step is carried out, the first molded resin part 51 with the flat plate 30 embedded therein is removed from the mold cavity 48, and a temporary fixation film 40 is detached from the surface of the first molded resin part 51 (this step is "first removing step") (see (c) of FIG. 4). This exposes the face, which is not in contact with the first molded resin part 51, of the flat plate 30.

This structure in which the flat plate 30 is embedded in the first molded resin part 51, at a point in time after the first removing step, can be regarded as the plate spring fixing structure 1Ba of Embodiment 2.

Then, after the first removing step is carried out, a circuit forming step and a plate spring forming step are carried out. The circuit forming step and the plate spring forming step may be carried out in any order. The circuit forming step can be carried out in the same manner as described in Embodiment 1.

In the plate spring forming step, as illustrated in (d) of FIG. 4, two portions of the flat plate 30 are pulled in the directions of arrow F3 and arrow F4 shown in (d) of FIG. 4, and thereby the flat plate 30 is divided and deformed. In this way, the first plate spring 12 and the second plate spring 13 are formed. This produces the plate spring fixing structure 1Bb or the electric contact structure 1C, each of which is arranged such that the spring portion 12b and the spring portion 13b of the plate springs are projecting from the surface of the first molded resin part 51. The plate spring fixing structure 1Bb and the electric contact structure 1C are the same, except that wires 20 are formed (circuit forming step has been carried out) in the electric contact structure 1C. In other words, the electric contact structure 1C of Embodiment 2 is obtained by providing the wires 20 on the plate spring fixing structure 1Bb.

Note here that, in Embodiment 1, the loads in the directions of arrows F1 and F2 can be easily applied to the flat plate 30 by pressing the flat plate 30 toward the inside of the space 11a. However, in Embodiment 2, there is no space into which the flat plate 30 can be pressed. Therefore, it is necessary to apply a pulling force, as indicated by arrows F3 and F4 in (d) of FIG. 4, to the flat plate 30.

This can be achieved by designing the flat plate 30 such that the flat plate 30 has a part that helps pulling (applying a load to) the flat plate 30. Note, however, that the application of a load is preferably carried out under the conditions in which the load is easy to apply.

In view of this, it is preferable that the faces, which are in contact with the first molded resin part 51, of the fixed portion 12a and the fixed portion 13a of the plate springs are, for example, roughened by etching or the like so that the fixed portion 12a and the fixed portion 13a are tightly fixed to the first molded resin part 51.

Furthermore, it is preferable that the faces, which are in contact with the first molded resin part 51, of the spring portion 12b and the spring portion 13b of the plate springs are, for example, coated with silicon or the like so that the spring portion 12b and the spring portion 13b become less adhesive to the first molded resin part 51.

Modified Embodiment

The following description will discuss a modified version of Embodiment 2 with reference to (a) and (b) of FIG. 5. For convenience, members having functions identical to those illustrated in the drawings of Embodiment 2 are assigned identical referential numerals and their descriptions are omitted.

(a) of FIG. 5 is a lateral cross-sectional view illustrating a plate spring fixing structure 1B or an electric contact structure 1C of a modified version of Embodiment 2. (b) of FIG. 5 illustrates the shape of a fixed portion 52a of a plate spring (first plate spring 52) of the plate spring fixing structure 1B or the electric contact structure 1C as viewed from the direction of arrow A1 in (a) of FIG. 5.

The plate spring fixing structure 1B and the electric contact structure 1C of this modified embodiment are different from those of Embodiment 2 in that the fixed portion of each plate spring has an embedded protrusion that is embedded and inwardly protruding in the first molded resin part.

As illustrated in (a) of FIG. 5, the electric contact structure 1C of this modified embodiment includes the first plate spring 52 and a second plate spring 53 which are embedded in a first molded resin part 51. The first plate spring 52 has: the fixed portion 52a embedded in and fixed to the first molded resin part 51; and a spring portion 52b which is not fixed to the first molded resin part 51, which projects from the surface of the first molded resin part 51, and which has a spring property. The second plate spring 53 has: a fixed portion 53a embedded in and fixed to the first molded resin part 51; and a spring portion 53b which is not fixed to the first molded resin part 51, which projects from the surface of the first molded resin part 51, and which has a spring property.

As illustrated in (b) of FIG. 5, the fixed portion 52a of the first plate spring 52 has an embedded protrusion 52c. Similarly, the fixed portion 53a of the second plate spring has an embedded protrusion 53c, which is not illustrated. The embedded protrusion 52c and the embedded protrusion 53c increase the surface areas, which are tightly fixed by the first molded resin part 51, of the fixed portion 52a and the fixed portion 53a. This makes it possible to enhance the fixation of the fixed portion 52a and the fixed portion 53a by the first molded resin part 51.

As has been described, a plate spring fixing structure of one aspect of the present invention includes: a plate spring that has an electric conductivity; and a first molded resin part to which the plate spring is partially fixed, the plate spring having a fixed portion and a spring portion, the fixed portion being embedded in and fixed to the first molded resin part, the spring portion having a spring property and being not fixed to the first molded resin part, the fixed portion having a face which is not in contact with the first molded resin part.

According to the above arrangement, the plate spring is partially embedded in the first molded resin part and fixed to the first molded resin part. Therefore, such a structure can be produced by, for example, injection molding of resin. This eliminates the need for a complex process for assembling plate springs bent in a three-dimensional manner. As such, it is possible to simplify production process and reduce production cost.

Furthermore, since the fixed portion has a face that is not in contact with the molded resin part, the foregoing structure can be produced by, for example: carrying out injection molding while keeping a temporary fixation member in a state in which it is temporarily bonded to that face of the fixed portion; and thereafter removing the temporary fixation member and adjusting the extent to which the plate spring is bent. This eliminates the need for a complex metal mold for injection molding, and also eliminates the need for, for example, a high-accuracy positioning between the metal mold and the plate spring. In addition, it is possible to adjust, during the production process, the extent to which the plate spring is bent. Furthermore, it is also possible to form, during the production process, a wire electrically connected to the plate spring.

This eliminates the need for a printed circuit board that needs to be large to a certain extent, eliminates the need for transferring the plate spring which has been bent in a three-dimensional manner, and makes it possible to reduce the size of the plate spring fixing structure.

As such, it is possible to provide a plate spring fixing structure which does not necessitate complex assembling processes and thus can reduce production cost and can be reduced in size, and which enables adjustment, during a production process, of the extent to which the plate spring is bent.

The plate spring fixing structure of one aspect of the present invention is preferably arranged such that the fixed portion is arranged such that: the face which is not in contact with the first molded resin part is one plate face at one side of the plate spring; and the other plate face at the other side of the plate spring and a side face perpendicular to the other plate face are each fixed tightly by the first molded resin part.

According to the above arrangement, the other plate face, opposite the face not in contact with the molded resin part, of the fixed portion of the plate spring and the side face perpendicular to this other plate face are each fixed tightly by the first molded resin part. Therefore, the fixed portion is fixed stably by the first molded resin part. In addition, an end of the fixed portion does not stick out of the first molded resin part. Therefore, the fixed portion is protected by the first molded resin part. Accordingly, it is possible to improve the durability of the plate spring fixing structure.

The plate spring fixing structure of one aspect of the present invention is preferably arranged such that, when the plate spring is elastically deformed such that one plate face of the fixed portion and one plate face of the spring portion are flush with each other, a side face, which is perpendicular to the one plate face of the spring portion, of the spring portion makes contact with the first molded resin part.

According to the above arrangement, in the space inside which the spring portion of the plate spring is projecting, a bottom is provided which corresponds to at least the thickness of the spring portion. Therefore, in a case where the plate spring fixing structure of the present invention is used as, for example, a holding structure for holding a cell, the cell can be held with an improved stability.

The plate spring fixing structure of one aspect of the present invention is preferably arranged such that the fixed portion has an unfixed face, the unfixed face is the face which is not in contact with the first molded resin part, and the fixed portion is embedded in the first molded resin part such that the unfixed face of the fixed portion is flush with or substantially flush with a surface of the first molded resin part.

According to the above arrangement, there is no or little difference in level between the surface of the first molded resin part and the unfixed face. Therefore, a wire that is electrically connected to the unfixed face of the plate spring can be easily formed on the surface of the first molded resin part with the use of an apparatus such as an inkjet printer.

The plate spring fixing structure of one aspect of the present invention can be arranged such that a line normal to one plate face of the spring portion and a line normal to one plate face of the fixed portion extend in different directions.

According to the above arrangement, the plate spring is bent at a desired position in its length. Therefore, one end portion of the plate spring is brought into pressure contact with an object such as a cell and can hold the object.

The plate spring fixing structure of one aspect of the present invention is preferably arranged such that the fixed portion has an embedded protrusion that is embedded and inwardly protruding in the first molded resin part.

According to the above arrangement, the fixed portion has the embedded protrusion. The embedded protrusion increases the surface area of the fixed portion tightly fixed by the first molded resin part. This makes it possible to enhance the fixation of the fixed portion by the first molded resin part.

An electric contact structure of one aspect of the present invention includes the plate spring fixing structure described above, the first molded resin part having a wiring circuit on a surface thereof, the wiring circuit being connected to the plate spring, the spring portion serving as an electric contact.

According to the above arrangement, it is possible to obtain an electric contact structure which includes a plate spring fixing structure, in which the wiring circuit electrically connected to the plate spring is provided on the surface of the first molded resin part, and in which the spring portion serves as an electric contact. The wiring circuit may be formed on the surface of the first molded resin part after the production of the plate spring fixing structure. Therefore, according to the electric contact structure, any soldering process or complex assembling process are not necessary in forming the wiring circuit, and the wiring circuit can be formed easily.

As such, the electric contact structure of the present invention provides a similar effect to the plate spring fixing structure. That is, it is possible to provide an electric contact structure which does not necessitate complex assembling processes and thus can reduce production cost and can be reduced in size, and which enables adjustment, during a production process, of the extent to which the plate spring is bent.

The electric contact structure of one aspect of the present invention can further include a second molded resin part that covers (i) the surface, in which the fixed portion is embedded, of the first molded resin part, (ii) the fixed portion, and (iii) the wiring circuit, and can be arranged such that the first molded resin part has a hole that faces away from the second molded resin part and that the spring portion projects inside the hole.

According to the above arrangement, the fixed portion and the wiring circuit are protected by the second molded resin part.

Furthermore, the spring portion is projecting inside the hole. Therefore, the second molded resin part defining the hole surrounds the spring portion. As such, the spring portion is also protected by the second molded resin part.

As such, the fixed portion and the spring portion are protected by the second molded resin part, and the durability of the electric contact structure is improved.

The electric contact structure of one aspect of the present invention is preferably arranged such that a resin material constituting the second molded resin part is less adhesive to the plate spring than a resin material constituting the first molded resin part is to the plate spring.

According to the above arrangement, when the spring portion makes contact with the second molded resin part while the second molded resin part is being formed by resin molding, the spring portion is prevented from being fixed to the second molded resin part.

The electric contact structure of one aspect of the present invention is preferably arranged such that a surface, which faces the second molded resin part, of the spring portion is less adhesive to the second molded resin part than a surface, which faces the second molded resin part, of the fixed portion is to the second molded resin part.

According to the above arrangement, when the second molded resin part is formed by resin molding, the spring portion is prevented from being fixed to the second molded resin part.

A method for producing a plate spring fixing structure of one aspect of the present invention includes: an attaching/temporarily fixing step including attaching and temporarily fixing a flat plate to a temporary fixation member, the flat plate having an electric conductivity and a spring property; a resin molding step including placing the temporary fixation member, which has the flat plate temporarily fixed thereon, within a metal mold and carrying out resin molding to form a first molded resin part such that the flat plate is embedded in the first molded resin part; a first removing step including removing the first molded resin part and detaching the temporary fixation member; and a plate spring forming step including bending the flat plate and thereby separating at least part of the flat plate from the first molded resin part to form a plate spring.

According to the above arrangement, by placing a flat plate in position and attaching it to a temporary fixation member and carrying out injection molding of resin, it is possible to obtain a molded resin part in which the flat plate is embedded in the molded resin part so as to have a face that is not in contact with the molded resin part. Then, by bending the flat plate and adjusting the extent to which the flat plate is bent and thereby forming a plate spring, it is possible to produce a plate spring fixing structure. This eliminates the need for a complex process for assembling a plate spring bent in a three-dimensional manner. As such, it is possible to simplify production process and reduce production cost.

This further eliminates the need for a complex metal mold for injection molding, and also eliminates the need for, for example, a high-accuracy positioning between the metal mold and the plate spring.

Accordingly, it is possible to produce a plate spring fixing structure which does not necessitate complex assembling processes and thus can reduce production cost and can be reduced in size, and which enables adjustment, during a production process, of the extent to which the plate spring is bent.

The method for producing a plate spring fixing structure of one aspect of the present invention can be arranged such that: the resin molding step includes (i) a first placing-in-mold step including placing the temporary fixation member, which has the flat plate temporarily fixed thereon, within a first lower mold and attaching the temporary fixation member to an inside of the first lower mold, and (ii) a first resin molding step including carrying out resin molding to form the first molded resin part between the first lower mold and a first upper mold such that the flat plate is embedded in the first molded resin part, the first upper mold having a protrusion configured to come into abutment with a portion of a surface of the flat plate, the first molded resin part having a hole situated above the flat plate; and the plate spring forming step includes bending the flat plate such that the flat plate projects inside the hole and thereby separating the at least part of the flat plate from the first molded resin part to form the plate spring.

According to the above arrangement, the plate spring can be formed by bending the flat plate such that it projects inside the hole. Therefore, the plate spring can be easily formed, and also one end of the plate spring is projecting inside the hole and surrounded and protected by the first molded resin part. This improves the durability of the plate spring fixing structure.

A method for producing an electric contact structure of one aspect of the present invention includes: the steps of the method for producing a plate spring fixing structure of the present invention; and a circuit forming step including forming a wiring circuit on a surface of the first molded resin part, the wiring circuit being connected to a surface of the plate spring, the circuit forming step being carried out after the first removing step of the method for producing a plate spring fixing structure.

According to the above arrangement, it is possible to produce an electric contact structure which has the advantages of the plate spring fixing structure of the present invention and in which the wire electrically connected to the plate spring is provided and one end of the plate spring serves as an electric contact.

A method for producing an electric contact structure of one aspect of the present invention can include: the steps of the method for producing a plate spring fixing structure of the present invention; a circuit forming step including forming a wiring circuit on a surface of the first molded resin part, the wiring circuit being connected to a surface of the plate spring, the circuit forming step being carried out after the first removing step of the method for producing a plate spring fixing structure; a second placing-in-mold step including placing the first molded resin part, which has the plate spring partially fixed thereto, within a second upper mold and attaching the first molded resin part to an inside of the second upper mold such that the plate spring is brought into a flat state, the second upper mold having a protrusion and being shaped so as to house the first molded resin part, the second placing-in-mold step being carried out after the circuit forming step; a second resin molding step including carrying out resin molding to form a second molded resin part between the second upper mold and a second lower mold such that the second molded resin part covers the plate spring in the flat state and the wiring circuit; and a second removing step including removing the first molded resin part, the plate spring, the wiring circuit, and the second molded resin part, the second removing step being carried out after the second resin molding step.

According to the above arrangement, the fixed portion of the plate spring and the wiring circuit are covered with the second molded resin part. This makes it possible to produce an electric contact structure which has an improved durability.

The method for producing an electric contact structure of one aspect of the present invention is preferably arranged such that the circuit forming step is carried out by forming the wiring circuit by printing a wire by spraying conductive ink.

According to the above arrangement, wiring connections can be made easily with the use of an inkjet printer or the like.

The present invention is not limited to the embodiments, but can be altered by a skilled person in the art within the scope of the claims. The present invention also encompasses, in its technical scope, any embodiment derived by combining technical means disclosed in differing embodiments. Further, it is possible to form a new technical feature by combining the technical means disclosed in the respective embodiments.

REFERENCE SIGNS LIST

1A Holding structure (plate spring fixing structure, electric contact structure)
1B Plate spring fixing structure
1C Electric contact structure
11, 51 First molded resin part
11a Space (hole)
12, 52 First plate spring
12a,13a Fixed portion
12a1, 13a1 Unfixed face (face which is not in contact with first molded resin part)
12b, 13b Spring portion
13, 53 Second plate spring
20 Wire (wiring circuit)
21 Second molded resin part
30 Flat plate
52c Embedded protrusion

The invention claimed is:

1. A plate spring fixing structure, comprising:
a plate spring that has an electric conductivity; and
a first molded resin part to which the plate spring is partially fixed,
the plate spring having a fixed portion and a spring portion, the fixed portion being embedded in and fixed to the first molded resin part, the spring portion having a spring property and being not fixed to the first molded resin part,
the fixed portion having a face which is not in contact with the first molded resin part,
the plate spring fixing structure being configured so that when the spring portion is elastically deformed such that one plate face of the fixed portion and one plate face of the spring portion are flush with each other, a side face, which is perpendicular to the one plate face of the spring portion, makes contact with the first molded resin part.

2. The plate spring fixing structure according to claim 1, wherein a line normal to one plate face of the spring portion and a line normal to one plate face of the fixed portion extend in different directions.

3. The plate spring fixing structure according to claim 1, wherein the fixed portion has an embedded protrusion that is embedded and inwardly protruding in the first molded resin part.

4. The plate spring fixing structure according to claim 1, wherein:
the fixed portion has a processed surface that makes contact with the first molded resin part; and
the fixed portion is fixed tightly by the first molded resin part with an anchor effect.

5. A plate spring fixing structure, comprising:
a plate spring that has an electric conductivity; and
a first molded resin part to which the plate spring is partially fixed,
the plate spring having a fixed portion and a spring portion, the fixed portion being embedded in and fixed to the first molded resin part, the spring portion having a spring property and being not fixed to the first molded resin part,
the fixed portion having a face which is not in contact with the first molded resin part,
the plate spring fixing structure being configured so that the fixed portion is arranged such that:
the face which is not in contact with the first molded resin part is one plate face at one side of the plate spring;
the other plate face at the other side of the plate spring and a side face perpendicular to the other plate face are each fixed tightly by the first molded resin part;

the fixed portion has an unfixed face, the unfixed face being the face which is not in contact with the first molded resin part; and the fixed portion is embedded in the first molded resin part such that the unfixed face of the fixed portion is flush with or substantially flush with a surface of the first molded resin part;

wherein when the spring portion is elastically deformed such that one plate face of the fixed portion and one plate face of the spring portion are flush with each other.

6. An electric contact structure comprising:

a plate spring fixing structure, the plate spring fixing structure including
- a plate spring that has an electric conductivity; and
- a first molded resin part to which the plate spring is partially fixed, the plate spring having a fixed portion and a spring portion, the fixed portion being embedded in and fixed to the first molded resin part, the spring portion having a spring property and being not fixed to the first molded resin part, the fixed portion having a face which is not in contact with the first molded resin part, the first molded resin part having a wiring circuit on a surface thereof, the wiring circuit being connected to the plate spring, the spring portion serving as an electric contact, the electric contact structure further comprising a second molded resin part that covers (i) the surface, in which the fixed portion is embedded, of the first molded resin part, (ii) the fixed portion, and (iii) the wiring circuit, the first molded resin part having a hole that faces away from the second molded resin part, the spring portion projecting inside the hole.

7. The electric contact structure according to claim 6, wherein a resin material constituting the second molded resin part is less adhesive to the plate spring than a resin material constituting the first molded resin part is to the plate spring.

8. The electric contact structure according to claim 6, wherein a surface, which faces the second molded resin part, of the spring portion is less adhesive to the second molded resin part than a surface, which faces the second molded resin part, of the fixed portion is to the second molded resin part.

9. A method for producing a plate spring fixing structure, comprising:

an attaching/temporarily fixing step comprising attaching and temporarily fixing a flat plate to a temporary fixation member, the flat plate having an electric conductivity and a spring property;

a resin molding step comprising placing the temporary fixation member, which has the flat plate temporarily fixed thereon, within a metal mold and carrying out resin molding to form a first molded resin part such that the flat plate is embedded in the first molded resin part;

a first removing step comprising removing the first molded resin part and detaching the temporary fixation member; and a plate spring forming step comprising bending the flat plate and thereby separating at least part of the flat plate from the first molded resin part to form a plate spring.

10. The method according to claim 9, wherein:

the resin molding step comprises a first placing-in-mold step comprising placing the temporary fixation member, which has the flat plate temporarily fixed thereon, within a first lower mold and attaching the temporary fixation member to an inside of the first lower mold, and a first resin molding step comprising carrying out resin molding to form the first molded resin part between the first lower mold and a first upper mold such that the flat plate is embedded in the first molded resin part, the first upper mold having a protrusion configured to come into abutment with a portion of a surface of the flat plate, the first molded resin part having a hole situated above the flat plate; and the plate spring forming step comprises bending the flat plate such that the flat plate projects inside the hole and thereby separating the at least part of the flat plate from the first molded resin part to form the plate spring.

11. A method for producing an electric contact structure, comprising:

the steps of the method according to claim 10;

a circuit forming step comprising forming a wiring circuit on a surface of the first molded resin part, the wiring circuit being connected to a surface of the plate spring, the circuit forming step being carried out after the first removing step;

a second placing-in-mold step comprising placing the first molded resin part, which has the plate spring partially fixed thereto, within a second upper mold and attaching the first molded resin part to an inside of the second upper mold such that the plate spring is brought into a flat state, the second upper mold having a protrusion and being shaped so as to house the first molded resin part, the second placing-in-mold step being carried out after the circuit forming step;

a second resin molding step comprising carrying out resin molding to form a second molded resin part between the second upper mold and a second lower mold such that the second molded resin part covers the plate spring in the flat state and the wiring circuit; and a second removing step comprising removing the first molded resin part, the plate spring, the wiring circuit, and the second molded resin part, the second removing step being carried out after the second resin molding step.

12. A method for producing an electric contact structure, comprising:

the steps of the method according to claim 9; and a circuit forming step comprising forming a wiring circuit on a surface of the first molded resin part, the wiring circuit being connected to a surface of the plate spring, the circuit forming step being carried out after the first removing step.

13. The method according to claim 12, wherein the circuit forming step is carried out by forming the wiring circuit by printing a wire by spraying conductive ink.

* * * * *